(12) United States Patent
Fifield et al.

(10) Patent No.: US 12,479,149 B2
(45) Date of Patent: Nov. 25, 2025

(54) METHOD FOR CONTINUOUSLY MANUFACTURING UHMWPE PRODUCTS

(71) Applicant: TEKALEN HOLDING VERWALTUNGS GMBH, Vreden (DE)

(72) Inventors: Robert Marc Fifield, Steensel (NL); Guido Terbrack, Vreden (DE)

(73) Assignee: TEKALEN HOLDING VERWALTUNGS GMBH, Vreden (DE)

( * ) Notice: Subject to any disclaimer, the term of this patent is extended or adjusted under 35 U.S.C. 154(b) by 565 days.

(21) Appl. No.: 17/625,935

(22) PCT Filed: Jul. 8, 2020

(86) PCT No.: PCT/EP2020/069255
§ 371 (c)(1),
(2) Date: Jan. 10, 2022

(87) PCT Pub. No.: WO2021/008970
PCT Pub. Date: Jan. 21, 2021

(65) Prior Publication Data
US 2022/0347909 A1    Nov. 3, 2022

(30) Foreign Application Priority Data
Jul. 17, 2019 (NL) ...................... 2023518

(51) Int. Cl.
*B29C 48/92* (2019.01)
*B29C 48/00* (2019.01)
(Continued)

(52) U.S. Cl.
CPC ............ *B29C 48/92* (2019.02); *B29C 48/022* (2019.02); *B29C 48/12* (2019.02); *B29C 48/288* (2019.02);
(Continued)

(58) Field of Classification Search
None
See application file for complete search history.

(56) References Cited

U.S. PATENT DOCUMENTS

| 3,883,631 A | 5/1975 | Murray |
| 3,887,319 A | 6/1975 | Cottingham |

(Continued)

FOREIGN PATENT DOCUMENTS

| JP | 2014113706 A | 6/2014 |
| KR | 20130075208 A | 7/2013 |

(Continued)

OTHER PUBLICATIONS

International Search Report; International Application No. PCT/EP2020/069255; International Filing Date: Jul. 8, 2020; Date of Mailing: Feb. 11, 2020; 7 pages.

(Continued)

*Primary Examiner* — Christopher T Schatz
(74) *Attorney, Agent, or Firm* — CANTOR COLBURN LLP (57) ABSTRACT

The present invention relates to a method for continuously manufacturing UHMWPE products comprising:—providing a counter-rotating twin-screw extruder;—feeding UHMWPE powder into a hopper of said counter-rotating twin-screw extruder;—transporting said UHMWPE powder from said hopper through said counter-rotating twin-screw extruder to an outlet of said counter-rotating twin-screw extruder;—further transporting said UHMWPE powder from said outlet of said counter-rotating twin-screw extruder to an entrance of a heat-controlled tooling system for defining the shape of UHMWPE products;—withdrawing said UHMWPE products from an outlet of said heat-controlled tooling system.

10 Claims, 4 Drawing Sheets

(51) Int. Cl.
    *B29C 48/12*     (2019.01)
    *B29C 48/285*    (2019.01)
    *B29C 48/41*     (2019.01)
    *B29C 48/875*    (2019.01)
    *B29K 23/00*         (2006.01)

(52) U.S. Cl.
    CPC ............ *B29C 48/41* (2019.02); *B29C 48/875* (2019.02); *B29C 2948/92209* (2019.02); *B29C 2948/9238* (2019.02); *B29K 2023/0683* (2013.01)

(56) References Cited

U.S. PATENT DOCUMENTS

| | | | |
|---|---|---|---|
| 4,145,175 A | 3/1979 | Groff et al. | |
| 5,286,576 A | 2/1994 | Srail et al. | |
| 5,342,187 A * | 8/1994 | Ohanesian | B29C 48/001 |
| | | | 264/177.17 |
| 5,399,308 A * | 3/1995 | Woodhams | B29C 55/06 |
| | | | 264/211.21 |
| 5,449,484 A | 9/1995 | Gusik et al. | |
| 7,276,287 B2 | 10/2007 | Smith et al. | |
| 2008/0020192 A1* | 1/2008 | Yen | B29C 48/307 |
| | | | 264/45.9 |
| 2017/0247483 A1* | 8/2017 | Tupe | C08F 110/02 |

FOREIGN PATENT DOCUMENTS

| | | |
|---|---|---|
| WO | 9211125 A1 | 7/1992 |
| WO | 2006069307 A2 | 6/2006 |
| WO | 2008009150 A1 | 1/2008 |
| WO | 2017085632 A1 | 5/2017 |

OTHER PUBLICATIONS

Written Opinion; International Application No. PCT/EP2020/069255; International Filing Date: Jul. 8, 2020; Date of Mailing: Feb. 11, 2020; 8 pages.

* cited by examiner

METHOD FOR CONTINUOUSLY MANUFACTURING UHMWPE PRODUCTS

CROSS REFERENCE TO RELATED APPLICATIONS

This application is a National Stage Application of PCT/EP2020/069255, filed Jul. 8, 2020, which claims the benefit of Dutch Application No. 2023518, filed Jul. 17, 2019, both of which are incorporated by reference in their entirety herein.

The present invention relates to a method for continuously manufacturing UHMWPE products. The present invention furthermore relates to a profile, rod, sheet or panel made of UHMWPE. The present invention relates to an apparatus for continuously manufacturing UHMWPE products.

Ultra-high-molecular-weight polyethylene, UHMW-PE, possessing according to ASTM standards, a molar mass >3 million grams/mole, is an intractable polymer, very similar to polytetrafluoroethylene, PTFE, well-known in the market e.g. as Teflon® produced by DuPont. Both UHMW-PE and PTFE are intractable polymers and not processable via the molten state using conventional processing techniques like injection-molding and/or melt-extrusion due to the very high molar mass resulting in a prohibitive high melt-viscosity. However, rather recently, the issue of melt-processing of PTFE has been solved by carefully controlling the microstructure of the polymer by introducing a (very) minor amount of comonomer which prevents the formation of too large PTFE crystals in the solid-state. In this context a reference is made to U.S. Pat. No. 7,276,287 disclosing a method for producing an article from a PTFE composition via melt processing. Expectations are running high for solving the processing issue for UHMW-PE as well.

UHMW-PE also includes copolymers with a minor amount of comonomer like hexene and butene (ASTM D4020-05, D6712-01 and ISO 11542-2). A lot of efforts have been made in the past decades to make UHMW-PE melt-extrudable by blending, with lower molecular weight linear polyethylenes and/or lubrication agents. The market for UHMW-PE as a base material for a variety of products ranging from profiles, sheets, fibers and medical implants, is at present limited to some 250 ktons/annum to be compared with standard polyethylene grades exceeding 100 million tons/annum in 2019.

In an article "Extrusion Processing of Ultra-High Molecular Weight Polyethylene", Haichen Zhang and Yong Liang, retrieved from the internet, http://dx.doi.org/10.5772/intechopen.72212, a review is given of the progress of extrusion processing technology for UHMWPE, including ram extrusion, single screw extrusion, twin screw extrusion and novel extrusion technology based on extensional rheology.

Typically, the horizontal ram-extruder for rod, bar or profile consists of a hopper, feeding an inlet chamber of a barrel, housing a reciprocating ram tip in the form of the extruded profile forcing material from the hopper into the heated die, for shaping and cooling. The ram extrusion process includes thus the steps of feeding, compaction, melting and plasticizing, extruding, cooling, and moulding. UHMWPE powder particles are fed quasi-continuously into ram extruder and heated at elevated temperatures. Such a process is not continuous since there is a pause in the cycle. Within the extruder, the powder particles are consolidated and maintained under pressure by the ram, as well as by the back pressure from UHMWPE melt, which caused by frictional forces of the molten resin against the die wall surface. UHMWPE melt is extruded from heated forming die with specified shape. The thrust force to overcome the huge resistance originated from positive displacement movement of the reciprocating ram.

Some disadvantages for ram extruder to process UHWMPE are, for example, fluctuations in product quality, longer melt plasticization cycle, slow extrusion rate, and high energy consumption and the presence of shot marks related to the discontinuous nature of ram-extrusion.

For a single screw extrusion process the material enters the barrel from the hopper, and the material is gradually pushed to the head direction with rotation of the screw. Successively, the material is passed through several functional areas of the extruder, including solid conveying section, melting section, and melt conveying section. Using a conventional single screw extruder it is almost impossible to process UHMWPE. Due to the low friction coefficient of UHMWPE and metal, UHMWPE powder particles in the feeding section are easy to slide with the rotating screw, resulting in the difficulty for powder particles being pushed forward. On the other hand, the melt is like rubber without viscous flow, which means a poor flowability for UHMWPE melt. The extremely high resistance is easily established in compaction section and results in huge backpressure due to the extremely high melt viscosity and poor flowability. Then, the melted resins are easy to wrap in the screw and rotate with the screw, preventing UHMWPE melt to move forward. It can even cause the screw to break if the device is forced to run.

Many attempts have been made in the past in relation to continuous processing of the UHMWPE in melt, solid and solution states by conventional processing techniques.

For example International application WO1992/011125 refers to a continuous production of a high modulus article by forcing polyethylene close to or at its melt temperature using a single screw extruder. The process disclosed in International application WO1992/011125 comprises the steps of forcing a high molecular weight plastic material, while it is close to or at its melt temperature, through a passage of which the cross-sectional area diminishes in the forward direction of plastic flow, thereby to produce an extrudate, lubricating the plastic material by adding between about 2.5% and 7.5% of Acuflow (Trade Mark) to the plastic material to obtain substantially plug flow of the material through the passage, and adjusting the speed of plastic flow with respect to the shape of the passage thereby resulting in an extrudate with substantially no molecular orientation. The step of lubricating the plastic material includes an injection of a liquid lubricant, e.g. ethylene glycol, glycerol and silicone oils, onto the surface of the melt stream prior to entry into the extrusion die or blending a commercial lubricant with the polymer prior to extrusion. Both techniques reduced the pressure and allowed extrusion of UHMWPE resins. According to WO1992/011125 very high molecular weight polyethylenes (VHMWPE) and ultra-high molecular weight polyethylenes (UHMWPE), have very high viscosities and with viscosities of this magnitude, the wall shear stress (if slip did not occur), is much higher than the strength of the melt, and severe melt fracture would occur. Extrusion without lubrication was experimentally found to be impractical. External lubrication was found to be required for smooth polymer flow and visually sound polymer extrudates. This process refers to a coalesced melt produced in an extruder having temperatures up to 200° C. far above a melting temperature of 137° C. The process disclosed in International application WO1992/011125 will not function for rod, profile or sheet production as the die cross-sectional area used has decreasing geometries.

International application WO 2017/085632 relates to a process for continuous extrusion of a high molecular weight polymeric material having high reduced specific viscosity, the process comprising the following steps: extruding, without the need of a die head, by conveying, through an extruder comprising an extruder screw rotating in a barrel, while maintaining a predetermined controlled temperature profile, the high molecular weight polymeric material, through a feed zone, a conveying/plasticizing zone and a compression/metering zone of the barrel, to obtain an extrudates, wherein, the compression ratio of the extruder screw is in the range of 2.5 to 4.5 for compacting the high molecular weight polymeric material and facilitating the free exit of the extrudate in the form of a tape or profile.

U.S. Pat. No. 5,286,576 relates to a ram-extrusion process for manufacturing a compression molded ultra-high molecular weight polyethylene (UHMWPE) composition having good flame retardancy and high impact strength. Other ram-extrusion publications may be illustrated with reference to U.S. Pat. Nos. 3,883,631, 3,887,319 and 4,145,175.

International application WO 2008/009150 relates to a ram-extrusion process for preparing UHMWPE panels comprising: providing a slit die which has a rectangular cross-section under ram-extrusion operating pressure, incrementally introducing UHMWPE resin particles into the die under pressure from a ram, heating the UHMWPE particles to a temperature above the crystalline melt temperature of UHMWPE to form a substantially continuous molten thermoplastic, cooling the UHMWPE while within the die and while maintaining contact with the walls of the die, and obtaining a solidified UHMWPE panel product which has exited the die, wherein the UHMWPE is cooled to a temperature below the crystalline melt temperature while within the die.

European patent application EP 0 590 507 relates to an apparatus for extrusion of polyethylene with an average molecular weight, measured by viscosimetry, of at least $1 \times 10^6$ g/mol, the apparatus is a single-screw extruder having a feed zone adjacent an upstream end and, a transition zone downstream of said feed zone, and a metering zone downstream of said transition zone. The apparatus comprises a barrel tube in the bore of which a screw shaft is rotatably mounted and which is provided, in a coolable feed zone, with optional pockets or grooves extending in the longitudinal direction and which has a heatable transition zone and an adjoining die. Korean patent application KR20130075208 relates to a method and an apparatus for extruding and processing an extrusion film of second-order ultra-high molecular polyethylene (VHMWPE). The extruder is equipped with a T-die module mounted on the bottom of the synthetic resin outlet, and a chill-roll that is responsible for cooling control of the synthetic resin melted at high temperature is used. In order to achieve a temperature distribution, an internal section is formed, and the internal section is divided into three sections, a hopper section, an intermediate section, and a pumping section, and temperature is adjusted for each section. A smooth film can be produced when the temperature of the chill roll of the resin discharged through the Tdie is 80° C. or higher.

International application WO 2006/069307 relates to a method for producing a multilayer microporous polymeric membrane, comprising the steps of forming at least two mixtures, separately heating each of the mixtures to an elevated temperature to produce a corresponding solution for each of the mixtures, co-extruding each the solution in contact with at least another of the solutions through a forming die under moderate shear to form a multilayer sheet, cooling the multilayer sheet, creating a microporous structure in the multilayer sheet to yield a microporous multilayer membrane, and drying the multilayer membrane. Such a microporous membrane having two or more layers or regions can have a thickness that can range from about 20 microns to about 70 microns.

Japanese patent application JP 2014 113706 relates to a twin-screw extruder main body for continuously extruding from a discharge port at the tip while kneading a rubber-like material charged from a supply port, and the discharge port. The twin-screw extruder main body is a cylinder hole communicating with the charging port and the discharging port and is divided into a single-thread screw portion on the hopper region side that is wound in a circular shape and a multi-thread screw portion on the feed region side in which a plurality of screw blades are spirally wound. Japanese patent application JP 2014 113706 is thus for rubbery material and uses a calendaring rolls 20U and 20 L to pull out and squeeze the rubbery material into its flat shape. The use of calendaring rolls would completely deform the shapes of the present UHMW-PE materials and the strainer as such is not useable in the present process due to state of the UHMWPE materials. In addition, the hopper with a ball of rubbery material that can be dealt with by the large uptake of the screw would block or jam the machine in the present method for continuously manufacturing UHMWPE products.

The known techniques like ram-extrusion and compression-moulding are very slow because a lot of heat has to brought in the UHMW-PE material to fully melt and, subsequently, cooled-down (quenched) to remove the heat from the material like sheets (compression-moulding) and rods (ram-extrusion). In the molten state the melt-viscosity is prohibitive high and, consequently, a lot of energy is required to force molten UHMW-PE through a tube like in the case of ram-extrusion. Moreover, the surface of the extruded rods in the case of ram-extrusion is of lower quality and shot-marks are visible due to the subsequent shots. In the case of compression-moulding sheets this procedure can take hours even up to a few days depending on the thickness of the pressed plates.

Publications discussed above are discontinuous operations and have not been successful for the continuous production of shot-free mark-free profiles based on ultra-high molecular weight polyethylene (UHMWPE).

In some processes lower molecular weight linear polyethylenes and/or lubricants are added but these additives will deteriorate the favorable properties of UHMW-PE products notably the abrasion resistance and impact resistance, the coefficient of friction as well as the chemical resistance.

In practice UHMW-PE is moulded via two standard techniques, viz. ram extrusion and/or compression moulding into semi-finished products which then require machining afterwards into the required products which is time consuming and invoke a lot of waste material.

An object of the present invention is to directly form and shape UHMWPE in products, such as profiles, rods, sheets and panels, without the characteristic shot marks of ram-extruded rods and the machining marks on sheets due to milling and planning.

Another object of the present invention is to provide a method for continuously manufacturing UHMWPE products wherein the surface quality and properties, for example friction, of the directly extruded products, such as profiles and sheets, is enhanced by inducing some surface orientation.

Another object of the present invention is to provide an extrusion method for continuously manufacturing virtually pure UHMWPE parts while avoiding melt fracture.

The present invention thus relates to a method for continuously manufacturing UHMWPE products comprising:
  providing a counter-rotating twin-screw extruder;
  feeding UHMWPE powder into a hopper of said counter-rotating twin-screw extruder;
  transporting said UHMWPE powder from said hopper through said counter-rotating twin-screw extruder to an outlet of said counter-rotating twin-screw extruder;
  further transporting said UHMWPE powder from said outlet of said counter-rotating twin-screw extruder to an entrance of a heat-controlled tooling system for defining the shape of UHMWPE products;
  withdrawing said UHMWPE products from an outlet of said heat-controlled tooling system.

The present inventors found that by making use of a counter-rotating twin-screw extruder for the transportation of UHMW-PE powder into a heat-controlled tooling system, i.e. a mould, one or more of the afore mentioned objects can be obtained. According to the present method for continuously manufacturing UHMWPE products complexly shaped profiles can be produced which are not possible to obtain via compression moulding and subsequent machining.

According to the present method the UHMW-PE powder is continuously fed via a hopper into the heated barrel of the twin-screw counter-rotating extruder in the transition-temperature region between solid and melt and transported into a mould. The final melting step is performed in the mould. Vacuum may be applied to the barrel of the extruder. The mould design is dependent on the product to be made such as profiles, rod and sheets. In the mould the UHMW-PE material is molten in a controlled way to obtain the favorable properties so characteristic for UHMW-PE like abrasion resistance and impact strength but to prevent an excessive melt-viscosity by applying heat which is subsequently relinquished further down the mould.

In an embodiment of the present method the temperature management of the counter-rotating twin-screw extruder during the transportation of UHMWPE powder through the counter-rotating twin-screw extruder is such that UHMWPE powder is in a transition-temperature region between solid and melt, wherein the temperature of the UHMWPE powder at the outlet of the counter-rotating twin-screw extruder is preferably $<=T_m$ (melting temperature).

In an embodiment of the present method the temperature at the outlet of the counter-rotating twin-screw extruder is lower than the temperature at the entrance of the heat-controlled tooling system. In the mould the real melting and consequential swelling process takes place, the final shaping is performed by controlled heating and heat management.

The present mould or heat-controlled tooling system is variable dependent on the desired product given that all shapes have a profile, more complicated forms other than sheet and rod can be realized. In the heat-controlled tooling system the UHMW-PE is brought into the molten state by heating lower than 185° C. and higher than 155° C., preferable lower than 175° C., more preferable lower than 165° C., in a controlled manner, to further improve the favorable properties of UHMW-PE such as abrasion resistance and toughness.

At the inlet of the mould from the counter-rotating twin-screw extruder a conversion is required from the round form delivered by the counter-rotating twin-screw extruder to the specific geometries of the final product.

In an embodiment of the present method the temperature management of the heat-controlled tooling system is such that the temperature of UHMWPE in the heat-controlled tooling system is >Tm. Such a temperature range in the mould enables the final melting and shaping step of the UHMWPE.

The temperature of UHMWPE in the heat-controlled tooling system is preferably in a range of 150 degrees centigrade and 180 degrees centigrade.

In an embodiment of the present method one or more additives may be added to the UHMWPE powder, the additives are chosen from the group of lubricants, pigments, antioxidants and process stabilizers. The total amount of additives is 0.1 to 2.5 wt. %, based on the total weight of the UHMWPE powder. If the total amount of additives is above the upper range, deterioration of the unique properties may occur, whereas a total amount of additives below the lower range will result in a low or even the absence of any positive effect on the processing of UHMWPE. The present inventors found that when a shape or form is extruded with geometries that give a large surface area, i.e. a large surface area to volume ratio, an example of which is a H profile, an amount up to 2.5 wt. % of additive, based on the total weight of the UHMWPE powder, in the form of a lubricant that is added mixed/blended with the UHMWPE powder prior to being fed into the hopper of the extruder, will aid the material movement in the tool thereby reducing the pressure in the extruder. By limiting the amount of additive in the material and keeping the temperature below the melting temperature of the resin in the extruder the present inventors found that melt fracture is avoided thereby retaining the beneficial properties of UHMWPE.

The present inventors found that swelling and malleability of the material may aid in facilitating the change in geometries. The entrance or feed channel of the mould preferably requires conical or trapezoid lands that increase in area in the forward direction of the material movement. This long funnel like entrance founds the initial section of transition from the extruder allowing the semi-solid material to be transformed into the melt and shaping into the required geometries of the moulds. In that context it is to be noted that conventional "fishtail", "manifold" or "coat-hanger" dies are unfavorable due to the high viscosity of the UHMWPE material. Moreover, it is preferred to provide a mould that is long enough for the UHMWPE material to become homogenously heated.

In an embodiment of a sheet mould it is preferred that the feed channel or entrance of the throat of the sheet mould has an ellipsoid form situated in the entry to the mould from the extruder. The initial part of the ellipsoid having a "bull nose" hemispherical segment. The function of this shape is to direct and distribute the semi-solid state UHMWPE material transversely over the cross-section of the tool, delivering a filled cross section of the mould the ellipsoid reduces its height in relation to the taper of the mould facilitating compression and compaction of the UHMWPE material into a desired and uniform shape.

In order to arrange a well-defined temperature profile along the length of the heat-controlled tooling system it is preferred that the heat-controlled tooling system comprises different temperature zones along the length of the heat-controlled tooling system. In an embodiment the mould has at least 4 different, more preferably 6 different temperature zones, to melt and subsequently cooling to induce crystallization in a very controlled way. In addition, it is also possible to apply friction reducing coatings to the internal surfaces of the mould.

In an embodiment a synchronized haul-off is used to withdraw UHMWPE product from the mould. The haul-off maybe either a motor driven caterpillar, belt, traction or roller type. The inventors found that by making small adjustments in extrusion pressure and regulating speed of the haul off the required tension can be applied to the extruded material. Extrudate may continue to draw-down in the tool when the material temperature in part of the mould is above the melting point. Synchronizations between the extruder and the haul-off are precise to realize accurate dimensioning of the profile. The haul-off maybe either a motor driven caterpillar, belt, traction or roller type known for plastic extrusion In an embodiment of the present method for continuously manufacturing UHMWPE products the step of withdrawing the UHMWPE products from the heat-controlled tooling system further comprises a synchronized haul-off.

According to the present method different shapes of UHMWPE products can be manufactured, such as profiles, rods, sheets and panels.

The present invention also relates to one or more products, such as profile, rod, sheet or panel made of UHMWPE, wherein the outer surface of such a product is free of shot marks, wherein the total amount of additives is 0.1 to 2.5 wt. %, based on the total weight of the product. The term "free of shot marks" means that the characteristic shot marks, as can be found on products manufactured according to the ram extrusion technology, do not appear on the outer surface of the present products, such as profile, rod, sheet or panel made of UHMWPE. The present inventors found that the material properties, such as the abrasive resistance and the impact strength, when the amount of additive exceeds 2.5 wt. % are significantly reduced. By limiting the amount of additive in the material and keeping the temperature below the melting temperature of the resin in the extruder melt fracture is avoided and the beneficial properties of UHMWPE are retained. It is to be noted that commercially available UHMWPE, for example GUR 4120 (manufactured by Celanese) contains approximately 500 ppm or 0.05% calcium stearate that is added by the manufacture in the industrial process. The calcium stearate is employed in part as an acid scavenger but also affects the movement of the powder particles, a lubricant; Thereby aiding the flow of the powder in bulk through pipes to fill bags trucks etc. For example, a UHMWPE from the company Braskem also contains from the manufacture calcium stearate in an amount of approximately 1000 ppm or 0.1%.

In an embodiment of the present invention the bulk of the UHMWPE material of the products, such as profile, rod, sheet or panel made of UHMWPE, lack the presence of shot-marks, too.

Another aspect is the creation of cylinders and bars with various rectangular cross sections from UHMWPE that have no shot-marks.

According to the present method it is now possible to manufacture complex-shaped UHMWPE profiles which cannot be made by machining ram-extruded rods or compression-moulded sheets. The advantage of the present method is that the surface quality of the final UHMWPE profiles and/or UHMWPE sheets is excellent, being smooth with a degree of luster when compared to ram-extruded rods or compression-moulded sheets and, moreover, enhanced abrasion resistance. Additional advantages are more homogenous particle clusters lower power/energy consumptions and a higher material output. The present inventors found that pictures on ram-extruded rods using a microscope with crossed polars, wherein samples were placed between two glass slides using decane to reduce the scattering due to surface roughness, clearly show that shot marks are not only visible on the surface but persist throughout the bulk of the material. This is in contrast with the UHMWPE rods according to the present invention since the rods according to the present invention not only lack the presence of shot marks on the outer surface but throughout the bulk of the UHMWPE material as well.

The present profile, rod, sheet or panel made of UHMWPE did not undergo additional processing for removing any shot marks.

The present invention also relates to an apparatus for continuously manufacturing UHMWPE products comprising a counter-rotating twin-screw extruder, the counter-rotating twin-screw extruder being provided with a hopper for feeding UHMWPE powder into the extruder and an outlet for discharging processed UHMWPE, a heat-controlled tooling system for defining the shape of UHMWPE products, the heat-controlled tooling system being provided with an entrance for processed UHMWPE and an outlet for shaped UHMWPE products, wherein the outlet of the counter-rotating twin-screw extruder is in communication with the entrance of the heat-controlled tooling system.

In an embodiment of such an apparatus the outlet of the heat-controlled tooling system is in communication with a haul-off system for withdrawing UHMWPE product from the outlet. The synchronized haul off "communicates" with the extruder via pressure measurements at the exit of the extruder. The pressure of extrusion is set at a certain value of bar the haul-off makes variations in speed to maintain the extruder pressure balanced around the set point.

Such a haul-off system for withdrawing UHMWPE product from the outlet is preferably chosen from the group of motor driven caterpillar, belt, traction or roller type, or a combination thereof.

In an embodiment the entrance of the heat-controlled tooling system comprises increasing conical or trapezoid lands. The cone angle of the conical portions decreases in the forward direction of plastic flow.

In an embodiment the heat-controlled tooling system comprises different temperature zones along the length of the heat-controlled tooling system.

The present invention is thus directed to the use of a counter-rotating twin-screw extruder to transport heated UHMWPE powder into a mould for compaction and consolidation of the material in the molten form.

The present disclosure is further illustrated herein below with the help of the following experiments. The experiments used herein are intended merely to facilitate an understanding of ways in which the embodiments herein may be practiced and to further enable those of skill in the art to practice the embodiments herein. Accordingly, the examples should not be construed as limiting the scope of embodiments herein.

Figure 1:
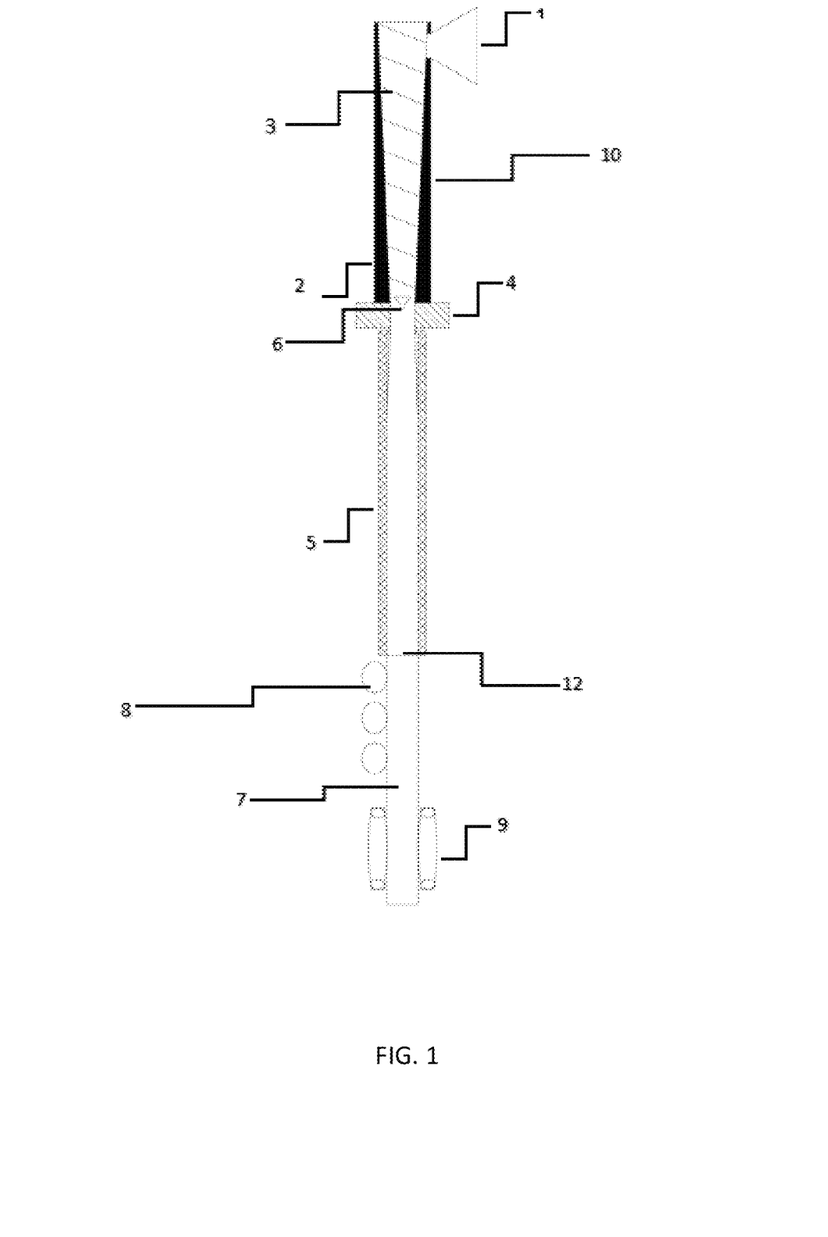
FIG. 1 illustrates schematically in a side view the present method for continuously manufacturing UHMWPE products with the downstream haul-off.

FIG. 1 illustrates schematically in a side view the apparatus 10 for continuously manufacturing UHMWPE products with a downstream haul-off. Counter-rotating twin-screw extruder 2 is provided with a hopper 1 for feeding UHMWPE powder (not shown) into hopper 1 of counter-rotating twin-screw extruder 2. Rotating twin screws 3 transport UHMWPE powder from hopper 1 through counter-rotating twin-screw extruder 2 to outlet 6 of counter-rotating twin-screw extruder 2. UHMWPE powder is further transported from outlet 6 of counter-rotating twin-screw extruder 2 to entrance 4 of a heat-controlled tooling system 5 for defining the shape of UHMWPE products. The UHMWPE products 7 are withdrawn from outlet 12 of heat-controlled tooling system 5 via a downstream haul-off system 8, 9, comprising rollers 8 and a driven belt 9.

Figure 2:
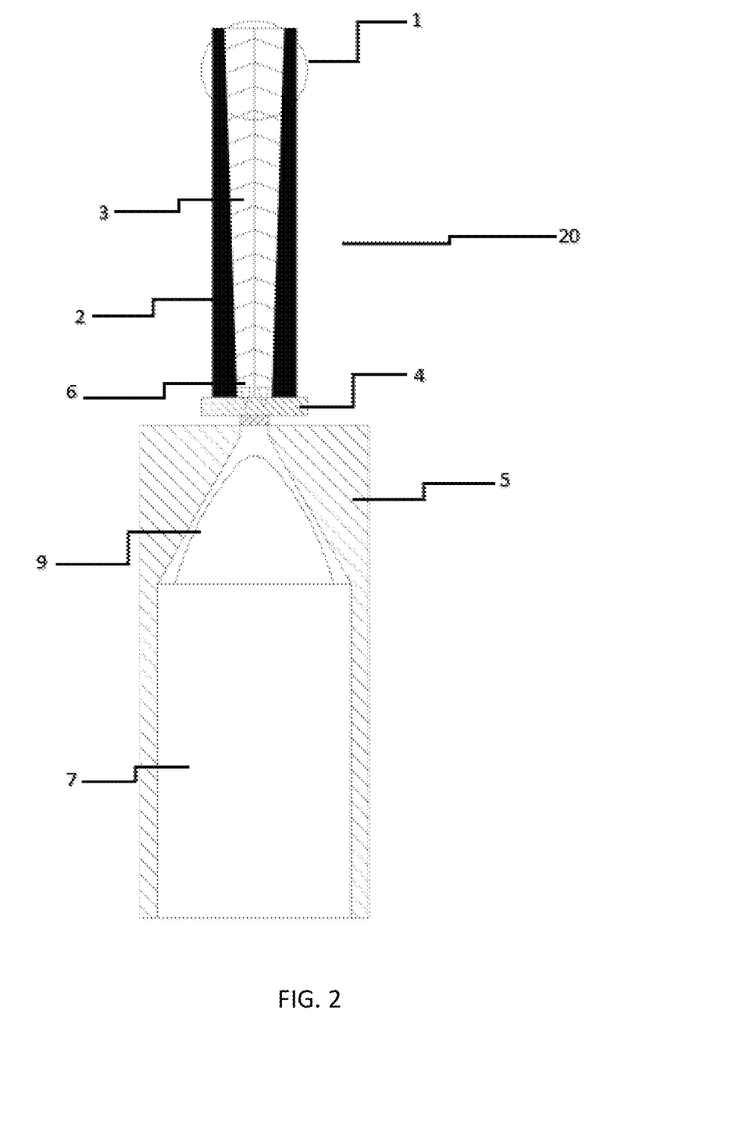
FIG. 2 illustrates schematically a top view of sheet extrusion.

FIG. 2 illustrates schematically a top view of an apparatus 20 for sheet extrusion. Counter-rotating twin-screw extruder 2 is provided with a hopper 1 for feeding UHMWPE powder (not shown) into hopper 1 of counter-rotating twin-screw extruder 2. Rotating twin screws 3 transport UHMWPE powder from hopper 1 through counter-rotating twin-screw extruder 2 to outlet 6 of counter-rotating twin-screw extruder 2. UHMWPE powder is further transported from outlet 6 of counter-rotating twin-screw extruder 2 to entrance 4 of a heat-controlled tooling system 5 for defining the shape of UHMWPE products. Heat-controlled tooling system 5 comprises increasing conical lands 9. The UHMWPE products 7 are withdrawn from heat-controlled tooling system 5 via a downstream haul-off system (not shown here).

Figure 3:
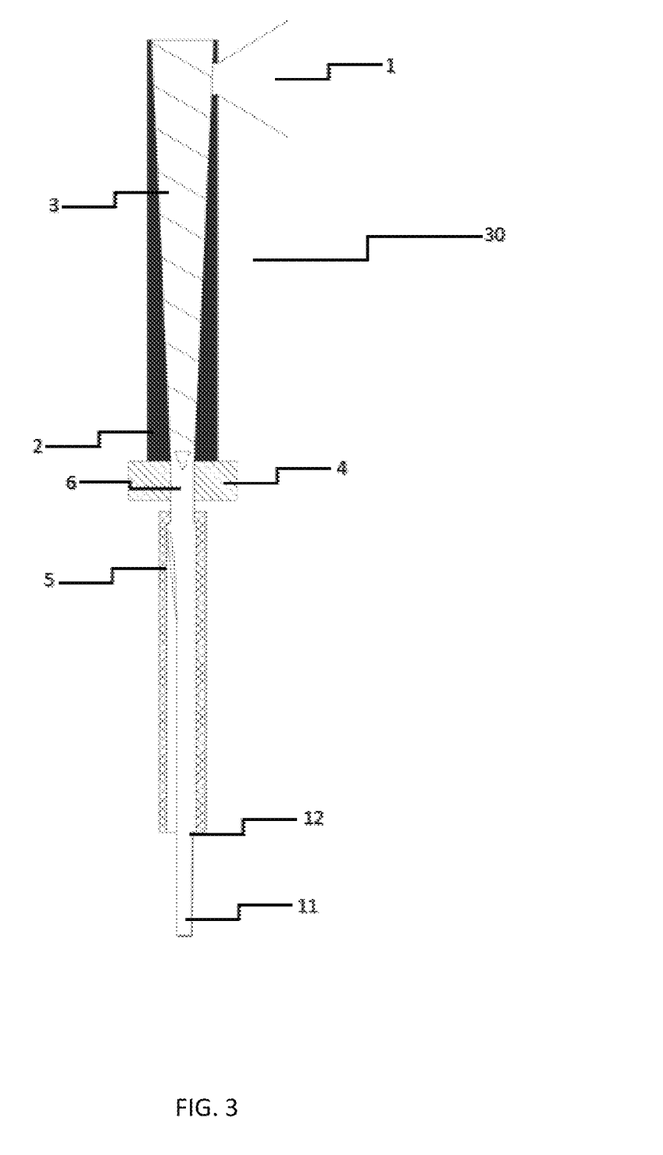
FIG. 3 illustrates schematically in a side view the present method for continuously manufacturing UHMWPE profiles.

FIG. 3 illustrates schematically in a side view the apparatus 30 for continuously manufacturing UHMWPE profiles with a downstream haul-off. Counter-rotating twin-screw extruder 2 is provided with a hopper 1 for feeding UHMWPE powder (not shown) into hopper 1 of counter-rotating twin-screw extruder 2. Rotating twin screws 3 transport UHMWPE powder from hopper 1 through counter-rotating twin-screw extruder 2 to outlet 6 of counter-rotating twin-screw extruder 2. UHMWPE powder is further transported from outlet 6 of counter-rotating twin-screw extruder 2 to entrance 4 of a heat-controlled tooling system 5 for defining the shape of UHMWPE products. The UHMWPE profiles 11 are withdrawn from outlet 12 of heat-controlled tooling system 5 via a downstream haul-off system (not shown here).

Figure 4:
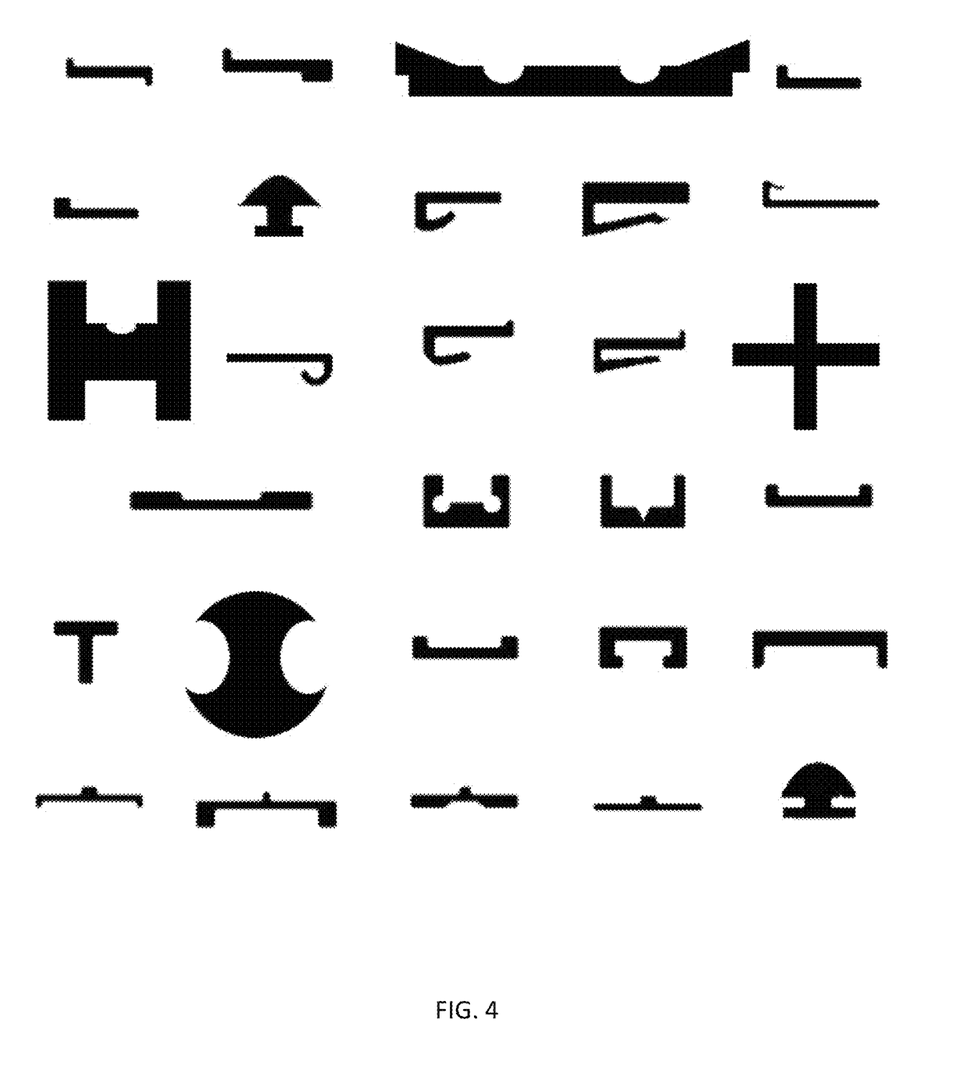
FIG. 4 illustrates schematically cross-sections of typical profiles types.

FIG. 4 illustrates schematically examples of cross-sections of typical profiles types that can be made with the present method for continuously manufacturing UHMWPE products. In practice, some of the dimensions would require re-defining.

EXAMPLE 1

A conical counter-rotating twin screw extruder (manufacturer Battenfeld, Cincinnati (USA)) is continuously fed via a hopper with a mix of 99.5% UHMWPE 4120 from Celanese, 0.15% Irganox B225 from BASF, 0.35% Ligastar, Peter Greven Gmbh. The extruder is run at 7 rpm having a temperature profile from the entrance throat to the exit of 80° C., 110° C., 125° C., 143° C. Extrusion pressure of about 140 bar was measured at the extruder outlet and vacuum was applied to the mid-section of the extruder. The extruder is directly connected to a 300 mm×15 mm sheet temperature controlled tooling system with an extended trapezoidal with an ellipsoid distribution section, where temperature-controlled zones rise from 150° C.-175° C. and then several subsequent zones reduced the temperature to 80° C. The extruded sheet is then passed over several appropriate rollers to a driven roller haul-off (manufacturer Anton Breyer KG) that is synchronized to the extruder giving a line speed of 4 m/hr. The extruded sheet thus produced has no shot marks at all.

EXAMPLE 2

A conical counter-rotating twin screw extruder (manufacturer Weber) is continuously fed via a hopper with a mix of 98.5% UHMWPE 3040 from Braskem, 0.15% Irganox B225 from BASF, 0.5% zinc stearate, 0.85% Lupolen 3621 M rt Lyondell Basel. The extruder is run at 4 rpm having a temperature profile from the entrance throat to the exit of 80° C., 110° C., 125° C., 140° C. Extrusion pressure of about 160 bar was measured at the extruder outlet and vacuum was applied to the mid-section of the extruder. The extruder is directly connected to a 22 mm×22 mm H profile mould with an extended trapezoidal entrance, where temperature-controlled zones rise from 150° C.-170° C. and then several subsequent zones reduced the temperature to 80° C. The extruded profile is then passed over an appropriate heated form table to a driven belt haul-off (manufacturer Weber) that is synchronized to the extruder giving a line speed of 12 m/hr. The extruded profile thus produced has no shot marks at all.

This rail type profile was produced for testing in a mechanical transport system such as found in depots and warehousing. The produced rail profile has runners traveling along and suspended from it. This method produced a reduction in surface friction and is noticeably quieter in use in a warehousing setup when compared with an equivalent compression moulded and machined profile.

EXAMPLE 3

A conical-counter-rotating twin-screw extruder (manufacturer Battenfeld Cincinnati, USA) is continuously fed via a hopper with a mix of 98.5% UHMWPE 4120 from Celanese, 0.25% Irganox B225 from BASF, 1.25% Ligastar, Peter Greven Gmbh. The counter-rotating twin screw extruder is run at 11 rpm having a temperature profile from the entrance throat to the exit of 80° C., 110° C., 125° C., 143° C. Extrusion pressure of about 140 bar was measured at the extruder outlet and vacuum was applied to the mid-section of the extruder. The extruder is directly connected to a 130 mm diameter mould (tooling system) with an extended conical entrance land, where temperature-controlled zones rise from 145° C.-170° C. and then several subsequent zones reduced the temperature to 80° C. The extruded rod is then passed over several appropriate rollers to a driven belt haul-off (manufacturer Battenfeld, Cincinnati (USA)) that is synchronized to the extruder giving a line speed of 2.2 m/hr. resulting as product. The extruded rod thus produced has no shot marks at all.

Comparative Example 1

A hydraulic ram-extruder for producing 130 mm diameter rod comprising a hydraulic pump which powers a reciprocating piston moving back and forth at the feed section of a heated tubular barrel is fed by the backwards motion of the piston allowing a measure, or a shot of UHMWPE material from a hopper to enter a 130 mm barrel at a suitably placed inlet. The material is then transported through the forwards motion of the piston and heated to 160° C.-200° C., the piston holds position for approximately 270 seconds before retracting allowing more material to enter the barrel and repeating the process. This alternating back and forth movement that allows a measure of material to enter the barrel causes shot-marks in this case every 40 mm-50 mm that are visible on the extruded rod. A line speed of 0.6 m/hr. of resulting product with visible shot marks was obtained. This comparative example of ram extrusion leads to a bar with shot marks.

Comparative Example 2

A conical counter-rotating twin screw extruder (manufacturer Battenfeld, Cincinnati (USA)) is continuously fed via a hopper with as supplied UHMWPE UTEC 3040 from the company Braskem. The extruder is run at speed settings between 3-9 rpm having a temperature profile from the entrance throat to the exit of 80° C., 110° C., 125° C., 143° C. Extrusion pressure was unstable at all rpms ranging between 100-380 bar measured at the extruder outlet, vacuum was applied to the mid-section of the extruder. The extruder is directly connected to a 130 mm diameter temperature-controlled tooling system with an extended conical entrance land where temperature-controlled zones rise from 150° C.-175° C. and then several subsequent zones reduced the temperature to 80° C. The extruded rod is then passed over several appropriate rollers to a driven belt haul-off (manufacturer Battenfeld Cincinnati (USA)) that is synchronized to the extruder. No stable line speed could be satisfactorily attained without frequent operator intervention, the extruded rod thus produced had dimensional and surface defects.

Lower properties result when an amount of additive greater than 2.5 wt. % is used, and can be seen when standard tests used for UHMWPE namely ISO 15527 (the sand slurry test which is used to quantify abrasive resistance), also in the impact strength/Charpy test ISO 11542 are applied. The reference material GUR® 4120 (PE-UHMW, Average molecular weight 4.7E6 g/mol Margolies' Equation, Density: 930 kg/m$^3$, ISO 1183) is a UHMWPE polymer made by Celanese that meets the requirements for the reference material required in the ISO standardized tests. It is a comparative test with samples being run simultaneously.

| Percentage - Additive (%) | Abrasion Test (acc. ISO 15527) | Impact Strength (Double Notch acc. ISO 11542) |
| --- | --- | --- |
| 3.0 | 182 | 110 |
| 1.5 | 90 | 170 |
| 0.5 | 87 | 178 |
| Reference (GUR4120) | 100 | 183 |

The invention claimed is:

1. A method for continuously manufacturing ultra-high molecular weight polyethylene (UHMWPE) products comprising:
    providing a counter-rotating twin-screw extruder;
    feeding UHMWPE material in a powder form into a hopper of said counter-rotating twin-screw extruder, wherein a temperature in the counter-rotating twin-screw extruder is <=Tm (melting temperature);
    transporting said UHMWPE material in the powder form from said hopper through said counter-rotating twin-screw extruder to an outlet of said counter-rotating twin-screw extruder;
    further transporting said UHMWPE material in the powder form from said outlet of said counter-rotating twin-screw extruder to an entrance of a heat-controlled tooling system for defining a shape of UHMWPE products, wherein said UHMWPE material in the powder form is brought into a molten state in said heat-controlled tooling system, and wherein said entrance of said heat-controlled tooling system comprises increasing conical or trapezoid lands;
    withdrawing said UHMWPE products from an outlet of said heat-controlled tooling system.

2. The method according to claim 1, wherein a temperature management of said counter-rotating twin-screw extruder during the transportation of said UHMWPE material in the powder form through said counter-rotating twin-screw extruder is such that the temperature of the UHMWPE material in the powder form at the outlet of said counter-rotating twin-screw extruder is optionally <Tm.

3. The method according to claim 1, wherein a temperature at the outlet of the counter-rotating twin-screw extruder is lower than a temperature at the entrance of the heat-controlled tooling system.

4. The method according to claim 1, wherein a temperature management of said heat-controlled tooling system is such that said UHMWPE material in the powder form is subjected to a temperature >Tm and the UHMWPE material in the powder form is brought into said molten state.

5. The method according to claim 4, wherein the temperature of said UHMWPE material in the powder form brought into said molten state is in a range of 150 degrees centigrade and 180 degrees centigrade.

6. The method according to claim 1, wherein said UHMWPE material in the powder form further comprises one or more additives chosen from the group of lubricants, pigments, antioxidants, process stabilizers, or a combination thereof,
    wherein the total amount of additives is optionally 0.1 to 2.5 wt. %, based on the total weight of the UHMWPE material in the powder form.

7. The method according to claim 1, wherein said heat-controlled tooling system comprises different temperature zones along the length of said heat-controlled tooling system.

8. The method according to claim 1, wherein said step of withdrawing said UHMWPE products from said heat-controlled tooling system further comprises a synchronized haul-off, wherein said haul-off is optionally chosen from the group of motor driven caterpillar, belt, traction or roller type, or a combination thereof.

9. The method according to claim 1, wherein the shape of said UHMWPE products is chosen from the group of profiles, rods, sheets and panels.

10. A method for continuously manufacturing ultra-high molecular weight polyethylene (UHMWPE) products comprising:
    providing a counter-rotating twin-screw extruder;
    feeding UHMWPE material in a powder form into a hopper of said counter-rotating twin-screw extruder, wherein a temperature in said counter-rotating twin-screw extruder is <=Tm (melting temperature);
    transporting said UHMWPE material in the powder form from said hopper through said counter-rotating twin-screw extruder to an outlet of said counter-rotating twin-screw extruder;
    further transporting said UHMWPE material in the powder form from said outlet of said counter-rotating twin-screw extruder to an entrance of a heat-controlled tooling system, wherein said UHMWPE material in the powder form is brought into a molten state in said heat-controlled tooling system for defining a shape of UHMWPE products;

withdrawing said UHMWPE products from an outlet of said heat-controlled tooling system wherein said entrance of said heat-controlled tooling system comprises increasing conical or trapezoid lands; and wherein said heat-controlled tooling system comprises different temperature zones along the length of said heat-controlled tooling system.

\* \* \* \* \*